(12) United States Patent
Kato et al.

(10) Patent No.: US 8,259,064 B2
(45) Date of Patent: Sep. 4, 2012

(54) TERMINAL DEVICE

(75) Inventors: Haruhisa Kato, Saitama (JP); Akio Yoneyama, Saitama (JP)

(73) Assignee: KDDI Corporation, Tokyo (JP)

( * ) Notice: Subject to any disclaimer, the term of this patent is extended or adjusted under 35 U.S.C. 154(b) by 707 days.

(21) Appl. No.: 12/428,087

(22) Filed: Apr. 22, 2009

(65) Prior Publication Data

US 2009/0267893 A1    Oct. 29, 2009

(30) Foreign Application Priority Data

Apr. 23, 2008    (JP) .................................. 2008-112416

(51) Int. Cl.
  *G09G 5/00* (2006.01)
  *G06K 9/46* (2006.01)
(52) U.S. Cl. ......... 345/158; 345/156; 382/190; 382/103
(58) Field of Classification Search ........................ None
  See application file for complete search history.

(56) References Cited

U.S. PATENT DOCUMENTS

| | | | |
|---|---|---|---|
| 5,548,667 A | 8/1996 | Tu | |
| 7,734,062 B2 * | 6/2010 | Kato et al. ..................... | 382/103 |
| 8,085,243 B2 * | 12/2011 | Yamashita et al. ............. | 345/158 |
| 2003/0048260 A1 * | 3/2003 | Matusis ........................ | 345/173 |
| 2007/0070037 A1 | 3/2007 | Yoon | |
| 2007/0262965 A1 * | 11/2007 | Hirai et al. .................... | 345/173 |
| 2009/0167682 A1 * | 7/2009 | Yamashita et al. ............. | 345/158 |
| 2009/0287361 A1 | 11/2009 | Iwashima et al. | |

FOREIGN PATENT DOCUMENTS

| | | |
|---|---|---|
| JP | 6-20055 A | 1/1994 |
| JP | 7-84714 A | 3/1995 |
| JP | 7-288875 A | 10/1995 |
| JP | 9-35066 A | 2/1997 |
| JP | 2001-28046 A | 1/2001 |
| JP | 2001-282456 A | 10/2001 |
| JP | 2002-269567 A | 9/2002 |
| JP | 2006-350844 A | 12/2006 |
| JP | 2007-95030 A | 4/2007 |

OTHER PUBLICATIONS

Japanese Office Action dated Mar. 28, 2012, issued in corresponding application 2008-112416, with English Translation.
Tamaki et al., "Personalized Color System for Robust Extraction of Skin-color", Transactions of the Virtual Reality Society of Japan, The Virtual Reality Society of Japan, vol. 12, No. 4, Dec. 31, 2007, pp. 471-478,with English Abstract.

* cited by examiner

*Primary Examiner* — Andrew L Sniezek
(74) *Attorney, Agent, or Firm* — Westerman, Hattori, Daniels & Adrian, LLP (57) ABSTRACT

An operation estimating portion estimates an input operation on the basis of motions of a nail and a finger which are shot, the directions, the number thereof or others. On the basis of estimation results of the input operation, a controller controls display content on a display and an application now in execution. The operation estimating portion includes a skin region extractor for extracting a skin region (first region) containing a nail region (second region) from a shot image, a nail region extractor for extracting the nail region from the thus extracted skin region, and a motion detector for following up a temporal change in the thus extracted nail region to detect motions of the nail region, thereby estimating the input operation on the basis of detection results of the motion detector.

9 Claims, 9 Drawing Sheets

(a) REFERENCE (b) 45° ROTATION (c) 90° ROTATION

TERMINAL DEVICE

BACKGROUND OF THE INVENTION

1. Field of the Invention

The present invention relates to a terminal device capable of capturing a shot image and, in particular, relates to a terminal device which detects motions of a subject inside the shot image to execute unique control allocated to each of the motions.

2. Description of the Related Art

High integration of electronic circuits has reduced the size and weight of a terminal device, thus resulting in a difficulty of securing a sufficient space for installing input operation units such as a keyboard and a mouse. Thus, there is a case where a user is obliged to perform a complicated input operation. An interface for detecting motions of the hand and fingers has been developed as an intuitive input operation unit in place of a keyboard or a mouse.

Patent Document 1 has disclosed a technology by which edge lines of a hand are extracted from an image picked-up by a camera and subjected to Hough transform, thereby detecting directions of fingers.

Patent Document 2 has disclosed a technology by which a circumscribed rectangle of a region included in a domain of the skin color of a hand is determined and subjected to Hough transform with respect to its entirety, thereby detecting straight lines which can be candidates of the fingers.

Patent Document 3 has disclosed a technology by which a hand region is extracted on the basis of body temperatures by referring to an image obtained by using an infrared camera, thereby identifying the ends of fingers by matching the thus extracted hand region to a predetermined pattern.

Patent Document 4 has disclosed a technology by which a finger sack having three color markers, that is, red, blue and yellow, is fitted to a finger of a user and shot by using a camera, and the markers are detected by referring to this shot image, thereby distinguishing motions of the finger.

Patent Document 1: Japanese Published Patent Application No. H6-20055
Patent Document 2: Japanese Published Patent Application No. H9-35066
Patent Document 3: Japanese Published Patent Application No. 2001-282456
Patent Document 4: Japanese Published Patent Application No. 2002-269567

In the Patent Documents 1, 2, since Hough transform greater in the amount of calculations for detecting straight lines is utilized, a terminal lower in processing capability such as a cellular phone is reduced in speed of executing an application to be operated, which is a problem. Further, an image of a finger is not always constituted only with straight lines but includes many curved lines on joints and wrinkles, thereby the finger cannot be detected with high accuracy only by detecting the straight lines. Still further, there is made no description about how to discriminate straight lines on the background from straight lines on the finger.

In the Patent Document 3, an infrared camera is used for shooting an image. However, an infrared camera has not become prevalent as a camera built inside a terminal device. The infrared camera must be, therefore, assembled additionally to increase electric power consumption due to the addition, which is another problem.

In the Patent Document 4, no special sensor is needed and a generally used camera can be only used to provide an intuitive operation. However, on every operation, a finger sack must be fitted, which is troublesome.

SUMMARY OF THE INVENTION

An object of the present invention is to provide a terminal device which does not need any additional hardware such as an infrared camera or accessories such as a finger sack but is capable of distinguishing accurately motions of the end of a finger in a smaller amount of calculations and executing control allocated to each of the motions.

In order to accomplish the above object, the present invention is a terminal device having a camera for shooting a subject continuously and a display, and means described below are provided.

(1) The present invention is provided with first feature extraction means for extracting a feature from a shot image, first region extraction means for applying the extracted feature to a first learning model to extract a first region, second region extraction means for applying a feature of the first region to a second learning model to extract a second region, which is a part of the first region, motion detection means for detecting motions of the second region, and control means for controlling a terminal device on the basis of detection results of the motions.

(2) The motion detection means includes at least anyone of counter for detecting the number of second regions, scaling detection means for detecting the scaling of a second region, moving detection means for detecting the motion of the second region, and direction detection means for detecting the direction of the second region.

According to the present invention, the following effects can be accomplished.

(1) In place of directly detecting a second region to be detected for the motion from a shot image, at first, a first region containing the second region is detected, then, with only the first region given as a target, the second region is extracted. Therefore, for example, where motions are detected at a nail region, a skin region covering fingers and a hand is first extracted as the first region and, with only the skin region given as a target, the nail region is to be detected. Thereby, it is possible to detect the nail region in a smaller amount of calculations with high accuracy.

(2) Not only motions such as motion, direction and scaling of the second region but also the number thereof are detected and the thus detected number is added to parameters to execute control. Therefore, it is possible to carry out complicated control which would be otherwise difficult only by referring to motions of the second region.

DETAILED DESCRIPTION OF THE PREFERRED EMBODIMENTS

Figure 1:
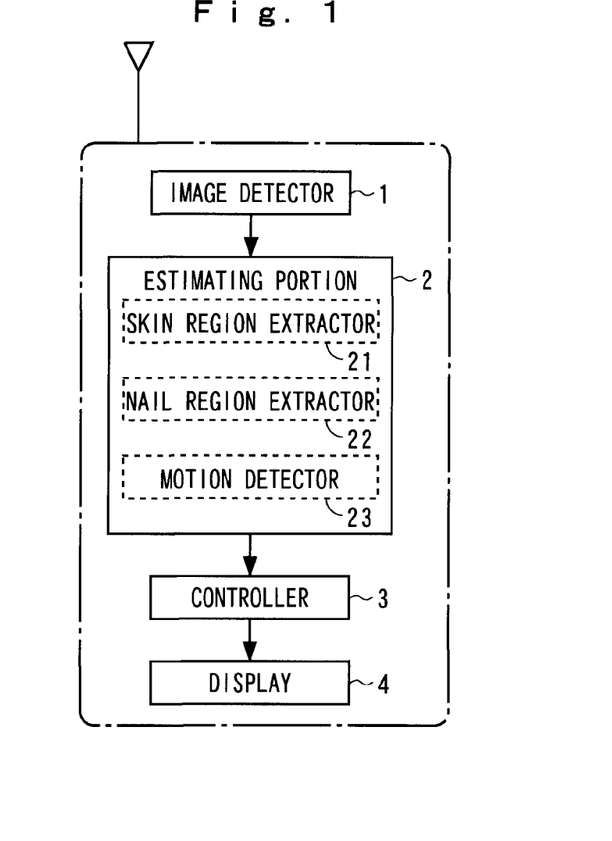
FIG. 1 is a functional block diagram showing a constitution of major parts of a cellular phone to which the present invention is applied.

Hereinafter, a detailed description will be given for the preferred embodiment of the present invention by referring to the drawings. FIG. 1 is a functional block diagram showing a constitution of major parts of a cellular phone to which the present invention is applied. Here, when describing the present invention, unnecessary constitutions have been omitted.

An image detector 1 shoots a subject continuously at a predetermined sampling cycle, outputting the shot image thereof. As the image detector 1, there can be used a digital camera standardly equipped on a cellular phone. In the present embodiment, the subject is a back side of a hand and shot so as to cover the nail of a finger in particular.

An operation estimating portion 2 estimates an input operation on the basis of motions of a nail and a finger which are shot, the directions, the number thereof or others. On the basis of estimation results of the input operation, a controller 3 controls display content on a display 4 and an application now in execution.

The operation estimating portion 2 includes a skin region extractor 21 for extracting a skin region (first region) containing a nail region (second region) from a shot image, a nail region extractor 22 for extracting the nail region from the extracted skin region, and a motion detector 23 for following up a temporal change in the extracted nail region to detect motions of the nail region, thereby estimating the input operation on the basis of detection results of the motion detector 23.

As described above, in the present embodiment, in place of directly detecting a nail region to be detected for the motion from a shot image, at first, a skin region containing the nail region is extracted, then, with only the skin region given as a target, the nail region is to be extracted. Thereby, the nail region, which is the same color tone as that of a finger or the back of a hand, can be detected in a smaller amount of calculations with high accuracy.

Figure 2:
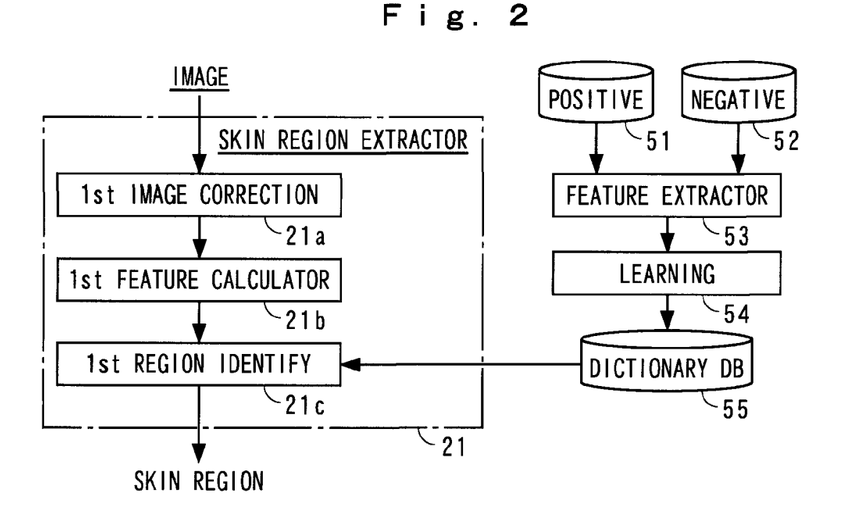
FIG. 2 is a functional block diagram showing a constitution of a skin region (first region) extractor.

FIG. 2 is a functional block diagram showing a constitution of the skin region (first region) extractor 21, extracting a skin region by applying a feature of the shot image to a learning model. Therefore, in the present embodiment, prior to extraction of the skin region by the skin region extractor 21, dictionary database (DB) 55 is formulated in advance.

In the present embodiment, a learning image containing a skin region is provided as a positive example 51, and a non-skin learning image free of the skin region is provided as a negative example 52, and the skin region and the non-skin region are manually extracted from these learning images, thereby a feature extractor 53 is used to extract skin and non-skin feature from each of the thus extracted regions. A learning portion 54 uses each of the thus extracted skin and non-skin feature to model the respective criteria for discriminating the skin region from the non-skin region, thereby registering them in the dictionary DB 55. This modeling may use any given distinguishing device such as a GMM (Gaussian Mixture Model) or a SVM (Support Vector Machine).

Any of the respective learning images 51, 52 of the positive example and the negative example, the feature extractor 53 and the learning portion 54 do not require loading on a cellular phone, but only the dictionary DB 55 may be loaded as the learning results. Where the learning portion 54 uses the GMM (Gaussian Mixture Model), a distribution probability P(x) of the skin or the non-skin can be obtained as a sum of a plurality of Gaussian distributions given by the following formula (1).

[Formula 1]

$$P(x) = \sum_{i=1}^{N} \frac{w_i}{\sqrt{(2\pi)^{D/2}|\Sigma_i|^{1/2}}} \exp\left(-\frac{1}{2}(x-\mu_i)^T (\sum_i)^{-1}(x-\mu_i)\right) \quad (1)$$

Where x and D represent respectively a feature extracted by the feature extractor 53 and an order thereof, N represents the number of Gaussian distributions. Each of the Gaussian distributions is given a weighting coefficient wi. The respective symbols of μi and Σi represent an average value and a covariance matrix. Parameters of the Gaussian distribution can be determined by utilizing a maximum likelihood method such as EM algorithm.

The learning portion 54 uses a general learning image in which a skin region is manually extracted to calculate a probability P(x|skin) which is that of the skin and generated by a feature x on the basis of the above formula (1). Similarly, a probability p(x|¬skin) which is that of the non-skin and generated by a feature x is calculated on the basis of the above formula (1). Then, parameters of the respective probability calculating functions, that is, the number of Gaussian distributions N, their average values μi, covariance matrixes Σi, and weighting coefficients wi are registered as information on learning models in the dictionary DB 55.

Where the skin of a user is used in learning, in place of the learning data, a feature extracted from a skin region of the user is used to calculate a probability. Then, if a skin probability learned by the learning data is given as Pg(x|skin) and a non-skin probability thereof is given as Pg(x|¬skin), and if a skin probability learned by using the skin of the user is given as Pu(x|skin) and a non-skin probability thereof is given as Pu(x|¬skin), the skin probability and the non-skin probability which reflect information on the skin of the user are given by the following formulae (2) and (3), respectively.

[Formula 2]

$$P(x|\text{skin}) = P_g(x|\text{skin})P_u(x|\text{skin}) \quad (2)$$

[Formula 3]

$$P(x|\neg\text{skin}) = P_g(x|\neg\text{skin})P_u(x|\neg\text{skin}) \quad (3)$$

In the present embodiment, as will be described later in detail, a feature extracted from a shot image is applied to the learning models to calculate a skin probability P(x|skin) and a non-skin probability P(x|¬skin). Then, a separately given threshold value TH1 is used to obtain a pixel in which a ratio L of the skin probability P(x|skin) to the non-skin probability P(x|¬skin) satisfies the following formula (4), and the pixel is referred to as a skin region.

[Formula 4]

$$L = \frac{P(x|\text{skin})}{P(x|\neg\text{skin})} > TH1 \quad (4)$$

It is noted that, with regard to the ratio L of the skin probability, values corresponding to all pixel values can be calculated in advance, by which the calculation result may be used as model information. In this instance, the model information is only referred to as a table and pixel values are only referred to as an index, thus making it possible to execute high-speed processing.

On the other hand, where the learning portion 54 uses a SVM, a feature specified by MPEG-7 is extracted from a previously provided learning data set, such a mapping and a hyper-plane are formulated that maximize a margin for separating a feature of a learning skin region from that of a learning non-skin region and output as model information.

In the present embodiment, as will be described later in detail, a feature extracted from a shot image is subjected to mapping on the SVM, and a position of the mapping with respect to the hyper-plane of the SVM can be referred to distinguish whether the input image is positive example content or negative example content. More specifically, each pixel extracted by the shot image is given as a skin region when a skin feature thereof is located at a region where a large feature at the learning skin region is present with reference to the separation hyper-plane of model information.

Where the skin of a user is used for learning, a feature extracted from the skin region of the user is added to the learning data, and a previously set weight is added to the skin feature of the user for learning. The above-described SVM has been described in V. N. Vapnik, "Statistical Learning Theory," John Wiley & Sons (1998) or others.

Returning to FIG. 2, where a shot image is not appropriately set for exposure conditions or white balance and the skin is not shot as skin color at the skin region extractor 21, a first image correction portion 21a corrects a color tone of the image. In the present embodiment, known technologies such as adjustment of contrast and adjustment of white balance are used to adjust the color tone. On adjustment of white balance, there can be used an assumption that R, G and B are evenly distributed in a general image and an assumption that a maximum value is white.

In the former case, if components of R, G and B of a pixel are given as ri, gi, bi, and the respective average values are given as Rave, Gave, Bave, pixels after adjustment of white balance (r'i, g'i, b'i) can be calculated by referring to the following formula (5).

[Formula 5]

$$r'_i = \frac{R_{ave} + G_{ave} + B_{ave}}{3R_{ave}} r_i \quad (5)$$

$$g'_i = \frac{R_{ave} + G_{ave} + B_{ave}}{3G_{ave}} g_i$$

$$b'_i = \frac{R_{ave} + G_{ave} + B_{ave}}{3B_{ave}} b_i$$

In the latter case, maximum values of the respective components (rmax, gmax, bmax) are assumed to be white, and pixels after adjustment of white balance (r"i, g"i, b"i) can be calculated by referring to the following formula (6).

[Formula 6]

$$r''_i = \frac{255}{r_{max}} r_i \quad (6)$$

$$g''_i = \frac{255}{g_{max}} g_i$$

$$b''_i = \frac{255}{b_{max}} b_i$$

The first feature calculator 21b calculates an image feature by every predetermined unit region (for example, a pixel unit) from a shot image. This feature can be calculated by using Color Layout, Color Histogram, Scalable Color, Dominant Color and Edge Histogram, etc., which are specified by MPEG-7. Alternatively, color information in itself which is converted to various types of color spaces such as HSV may be used.

The first region identifying portion 21c extracts a skin region from a shot image on the basis of a feature of the shot image and learning model information registered in the dictionary DB 55 and also calculates a center of gravity of the skin region and an average pixel value. Coordinates (xp, yp) of the center of gravity can be obtained from the following formula (7) by using position information (xi, yi) on each pixel of the skin region. Position information on the thus calculated skin region, the center of gravity and the average color are output as skin region information into a nail region extractor 22 to be described later.

[Formula 7]

$$x_p = \frac{1}{n} \sum_i^n x_i \quad (7)$$

$$y_p = \frac{1}{n} \sum_i^n y_i$$

Figure 3:
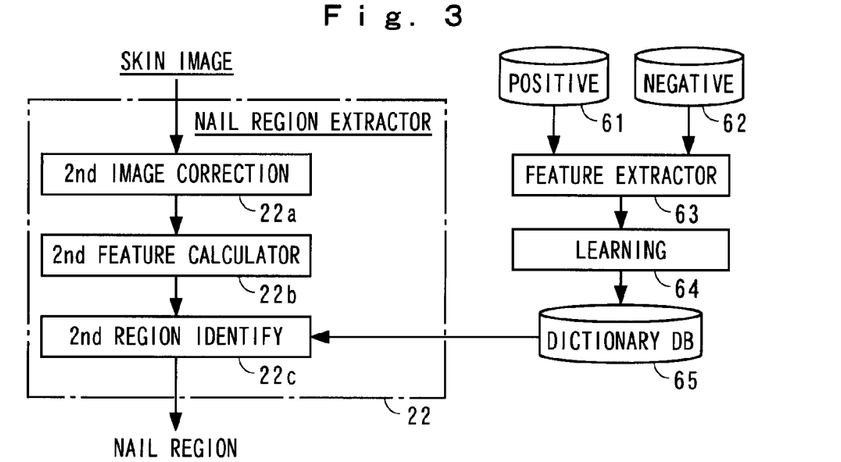
FIG. 3 is a functional block diagram showing a constitution of a nail region (second region) extractor.

FIG. 3 is a functional block diagram showing a constitution of the nail region (second region) extractor 22, and on the basis of an image of the skin region extracted by the skin region extractor 21, the feature thereof and the learning model, a nail region is extracted from the skin region. Therefore, in the present embodiment as well, prior to extraction of the nail region, the dictionary database (DB) 65 is formulated in advance.

More specifically, a learning image containing the nail region is provided as a positive example 61 and also a non-skin learning image free of the nail region is provided as a negative example 62. Then, the nail region and the non-nail region are manually extracted from these learning images, thereby extracting nail and non-nail feature at a feature extractor 63. The learning portion 64 uses the respective extracted nail and non-nail feature to model criteria for discriminating the nail region from the non-nail region, thereby registering them at the dictionary DB 65.

A method for formulating the learning model is the same as that for formulating the learning model which discriminates the skin region from the non-skin region, the description of which will be omitted here. Further, the respective learning images 61, 62 of the positive example and the negative example, the feature extractor 63 and the learning portion 64 do not require loading on a cellular phone, either. Therefore, only the dictionary DB 65 as learning results may be loaded.

In order to easily detect a target to be distinguished in subsequent processing, the second image correction portion 22a uses the skin region information extracted by the skin region extractor 21 to correct a shot image. At the first image correction portion 21a, characteristics of a general image are used to correct the image, while at the second image correction portion 22a, characteristics of the skin region information extracted by the skin region extractor 21 are used to correct the image. In particular, where no appropriate white balance is set, hue is deteriorated. For this reason, the second image correction portion 22a calculates a difference between the hue of average color of the skin region and the hue of the positive example 51 at a HSV color space as correction information, thereby outputting the difference into the second feature calculation portion 22b.

The second feature calculation portion 22b adds the correction information calculated by the second image correction portion 22a to respective pixel values extracted by the skin region extractor 21 inside a skin region and in the vicinity of the region. Further, as with the first feature calculator 21b, Color Layout, Color Histogram, Scalable Color, Dominant Color or Edge Histogram, which is specified by MPEG-7, is applied to calculate a nail feature for respective pixel values after correction. Alternatively, to a skin feature calculated by the first feature calculator 21b added is the correction information calculated by the second image correction portion 22a, the result of which may be given as a nail feature. It is, therefore, possible to simplify the processing of calculating the feature.

Since a nail region is provided with a unique gloss which is not found at a skin region, this gloss may be used as a feature of the nail region. More specifically, the nail is higher in reflection rate of light than the skin, by which it is more likely that a maximum pixel value in the vicinity of the skin region may be the nail. Further, since the nail is appropriately round in shape, it often has a face for reflecting light directly from a light source to an image detector. Thus, from the inside of the skin region extracted by the skin region extractor 21 and the vicinity region thereof, there is selected a maximum value of pixels, and a pixel having a pixel value greater than a predetermined threshold value (more than one time) with respect to the maximum value thereof may be given as a pixel of the nail region.

Figure 4:
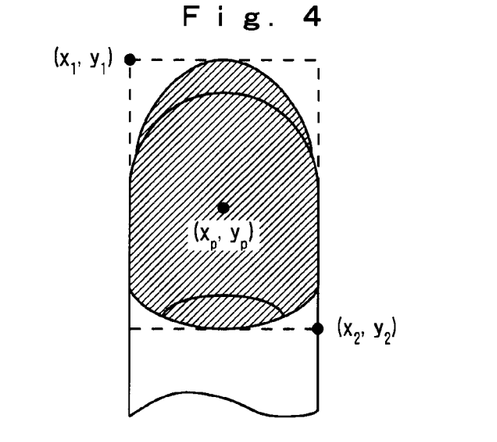
FIG. 4 is a view for explaining nail region information for identifying the nail region.

The second region identifying portion 22c applies a feature extracted by the second feature calculation portion 22b to the learning model information registered at the dictionary DB 65, thereby extracting the nail region. In the present embodiment, as exemplified in FIG. 4, the center of gravity (xp, yp) of the nail region (the hatching portion) and positions (x1,y1), (x2, y2) of a circumscribed rectangle containing a pixel judged to be the nail region are calculated and notified as nail region information to the motion detector 23. Where a plurality of nail regions is extracted, calculation is made by each of the nail regions for the center of gravity and the positions of the circumscribed rectangle.

Where a plurality of the nail regions is adjacent to each other, they may often bond together. In this instance, in order to separate the nail regions, each of the nail regions is projected in a direction bonding the center of gravity of the nail regions to the center of gravity of the skin region, thus making it possible to separate the nail regions by an axis taking a minimum value less than a value obtained by multiplying a maximum value of the projection by a previously set constant a ($0 \leq a \leq 1$).

Figure 5:
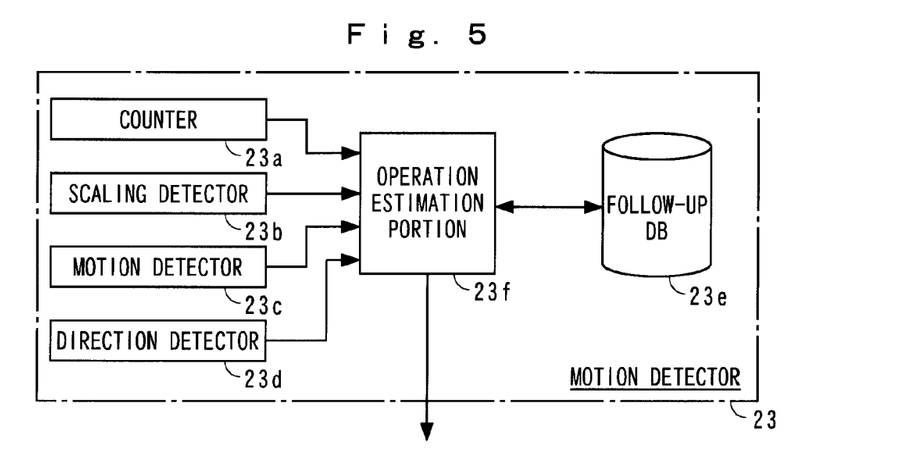
FIG. 5 is a block diagram showing a constitution of a motion detector.

FIG. 5 is a block diagram showing a constitution of the motion detector 23, and the counter 23a detects the number of nail regions inside a shot image. The scaling detector 23b compares the size of the nail region at time t−1 with the size of the nail region at time t, thereby detecting the scaling of the nail region. In the present embodiment, on the basis of a proportion changed in area of a circumscribed rectangle of the nail region, detected are whether the nail region is scaled up or down and at which percentage.

The motion detector 23c detects motions of a nail region. In the present embodiment, on the basis of the center of gravity pi of the nail region i at the time t and the center of gravity pj of the nail region j at time t−1, the motions of the nail region are detected.

Where a plurality of nail regions is present, with regard to the nail region i at the time t and the nail region j at the time t−1, as shown in the following formulae (8) and (9), a difference between the respective centers of gravity pi, pj, a difference between the average colors ci, cj and a difference between the sizes si, sj are respectively multiplied by previously set weighting values wp, wc, ws to obtain a sum, which is given as a distance dij, and a combination which minimizes the total sum Σdij is obtained as a corresponding relationship between the nail region i and the nail region j. On the basis of this corresponding relationship, the motions of the nails are detected.

[Formula 8]

$$\min_{ij} \sum d_{ij} \tag{8}$$

[Formula 9]

$$d_{ij} = w_p(p_i - p_j)^2 + w_c(c_i - c_j)^2 + w_s(s_i - s_j)^2 \tag{9}$$

More specifically, at the time t−1 two nail regions j1, j2 are detected, and at the time t as well two nail regions i1, i2 are detected. When a total sum of a distance dj1i1 between the nail regions j1, i1 and a distance dj2i2 between the nail regions j2, i2 is a minimum value, it is estimated that the nail region j1 has moved to the nail region i1 and the nail region j2 has moved to the nail region i2. Then, if a corresponding relationship between the respective nail regions can be estimated, coordinate positions of the respective nail regions are known and on the basis of the locus, motions of the respective nail regions can be detected.

The direction detector 23d calculates a direction of the nail on the basis of the center of gravity of a nail region and the center of gravity of a skin region. In the present embodiment, the center of gravity of the skin region is subtracted from the center of gravity of the nail region, by which a direction vector indicated by the nail is calculated. It is noted that where a plurality of nail regions is detected, an average value of the centers of gravity of respective nail regions are used to represent the center of gravity of the nail.

At the follow-up database (DB) 23e, with respect to the number of nail information and scaling, a predetermined input operation is allowed to correspond. Further, with respect to continuous motions in lateral or vertical directions to the nail region and one-stroke motions of writing circles, triangles and squares or others, a predetermined input operation is allowed to correspond. Still further, with respect to lateral and vertical directions at the nail region, a predetermined input operation is allowed to correspond.

The operation estimating portion 23f uses as parameters the number of nail regions detected by each of the detectors 23a, 23b, 23c, 23d, scaling, motions and directions thereof to search the follow-up DB 23e, reading an input operation which is allowed to correspond to the detection result, thus outputting it into the controller 3. The controller 3 controls a cellular phone on the basis of estimated results of the input operation.

Figure 6:
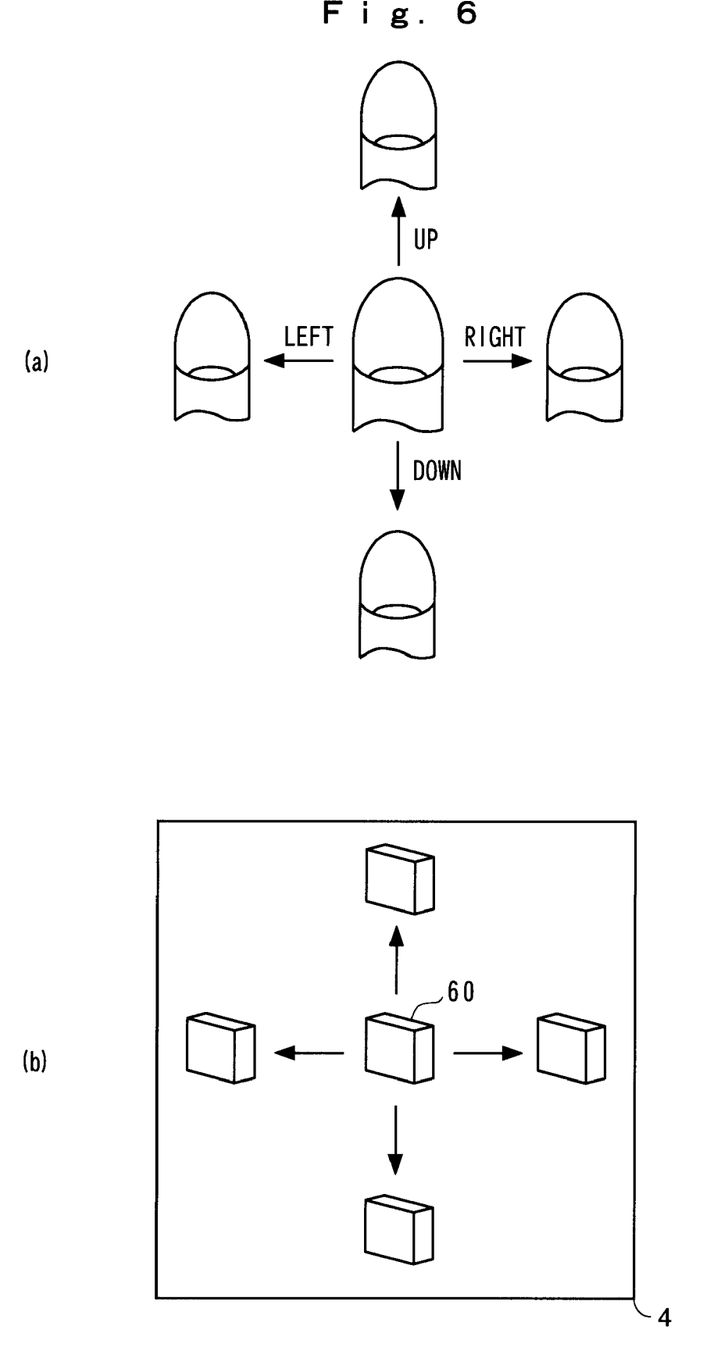
FIG. 6 are views showing one embodiment in which, depending on the motion of the nail region inside a shot image in all directions, display content on a display is controlled.

FIG. 6 are views showing one embodiment [FIG. 6(b)] in which, depending on a lateral or vertical motion [FIG. 6 (a)] of the nail region inside a shot image, the display content on a display 4 is controlled. In the present embodiment, the motion of the nail region is allocated to the motion of an object 60 displayed on the display 4, and when the nail region is moved vertically and laterally inside the shot image, in synchronization therewith, the object 60 displayed on the display 4 also moves vertically and laterally in a similar manner.

Figure 7:
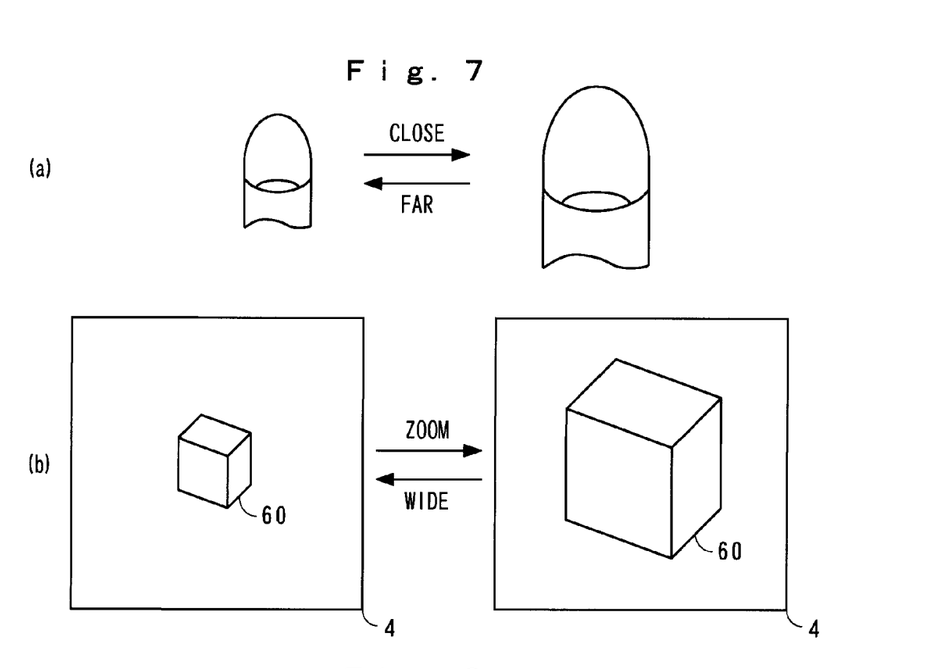
FIG. 7 are views showing one embodiment in which, depending on change in area of the nail region inside the shot image, the display content on the display is controlled.

FIG. 7 are views showing one embodiment [FIG. 7(b)] in which, depending on change in area [FIG. 7(a)] of the nail region inside a shot image, the display content on the display 4 is controlled. In the present embodiment, the area of the nail region is allocated to the scaling of the object 60 displayed on the display 4. When the nail region is brought closer to the camera 1, in synchronization therewith, the object 60 displayed on the display 4 is scaled up. Similarly, when the nail region is spaced apart from the camera 1, in synchronization therewith, the object 60 displayed on the display 4 is scaled down.

Figure 8:
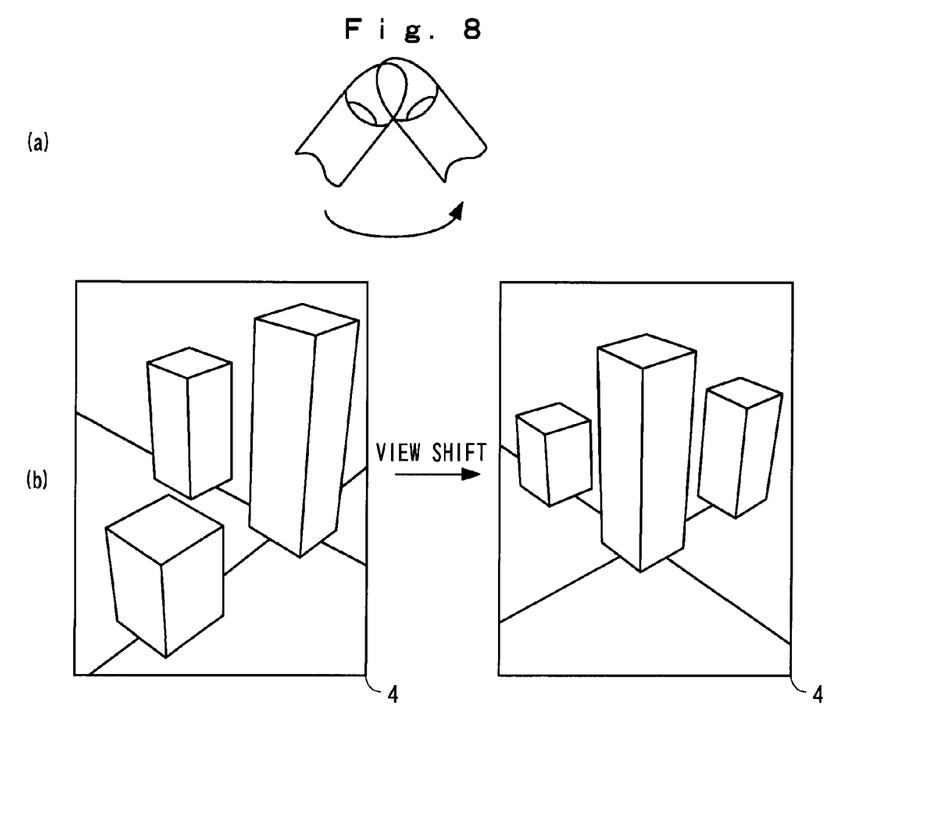
FIG. 8 are views showing one embodiment in which, depending on the rotational motion of the nail region, the display content on the display is controlled.

FIG. 8 are views showing one embodiment [FIG. 8(b)] in which, depending on a rotational motion [FIG. 8(a)] of the nail region, the display content on the display 4 is controlled. In the present embodiment, the rotational motion of the nail region is allocated to a virtual motion of a visual line. When the nail region is moved rotationally inside a shot image, in synchronization therewith, moved is a visual line viewing the object 60 displayed on the display 4.

In the embodiment described by referring to FIGS. 6, 7, and 8, one nail region is provided. It is also acceptable that where a second nail region is detected at any timing, the detection is recognized as a clicking operation to move to predetermined control.

Figure 9:
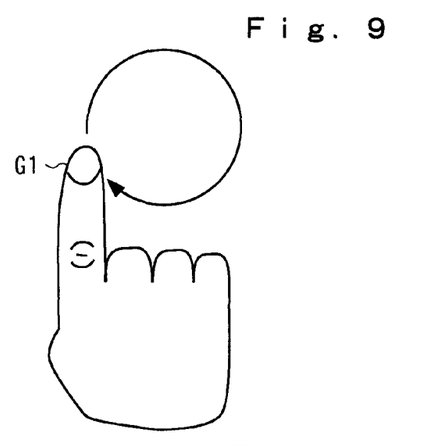
FIG. 9 is a view showing one embodiment in which upon circular motion of the one nail region, the content on the display is controlled.
Figure 10:
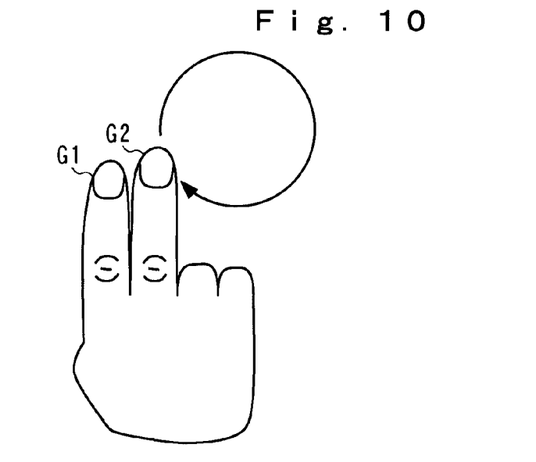
FIG. 10 is a view showing one embodiment in which upon circular motion of the two nail regions, the content on the display is controlled.
Figure 11:
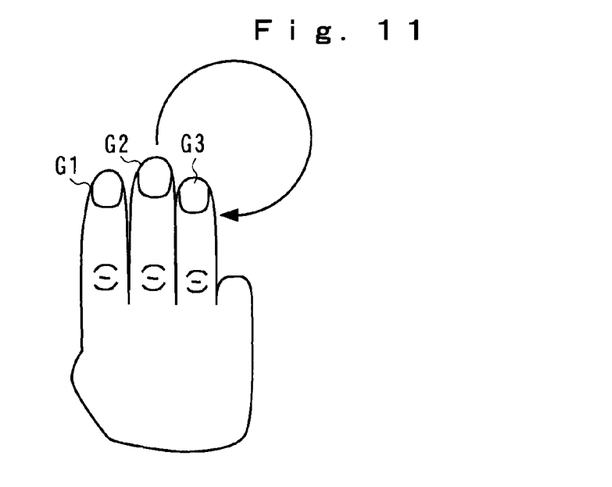
FIG. 11 is a view showing one embodiment in which upon circular motion of the three nail regions, the content on the display is controlled.

FIGS. 9, 10 and 11 are views showing a method for inputting an operation in which the object displayed on the display 4 is rotated at the center of any one of the x axis, the y axis and the z axis thereof, and the motion of the nail region is allocated to the motion of the object, and the number of the nail regions is allocated to the rotational axis.

Figure 12:
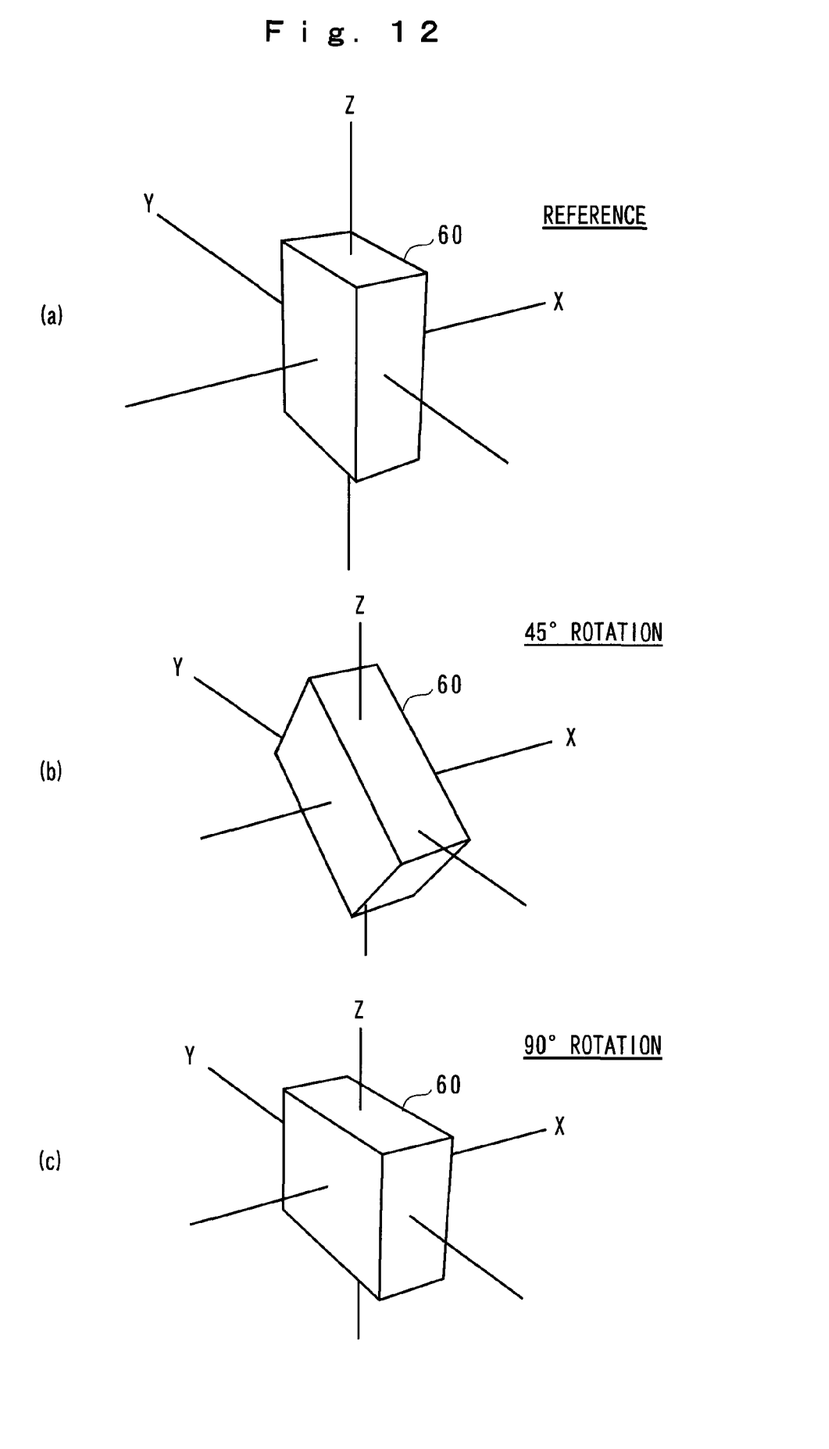
FIG. 12 is a view showing one example in which upon motion of the one nail region, an object moves on the display.

In the present embodiment, the nail region is moved in a circular manner, thereby indicating the rotation of an object. Where one nail region is provided, the x axis is indicated as a reference axis for rotation, where two nail regions are provided, the y axis is indicated, and where three nail regions are provided, the z axis is indicated. Therefore, as shown in FIG. 9, when one nail region G1 is moved in a circular manner, as exemplified in FIG. 12, the object 60 on the display 4 is rotated (pitched) from a reference posture [FIG. 12(a)] in a three dimensional space at the center of the x axis. In this instance, the object 60 is rotated at an angle depending on an extent of motion of the nail region G1. For example, if the nail region G1 is rotated by one round, it is rotated only by 45° [FIG. 12(b)] and if rotated by two rounds, it is rotated only by 90° [FIG. 12(c)].

Figure 13:
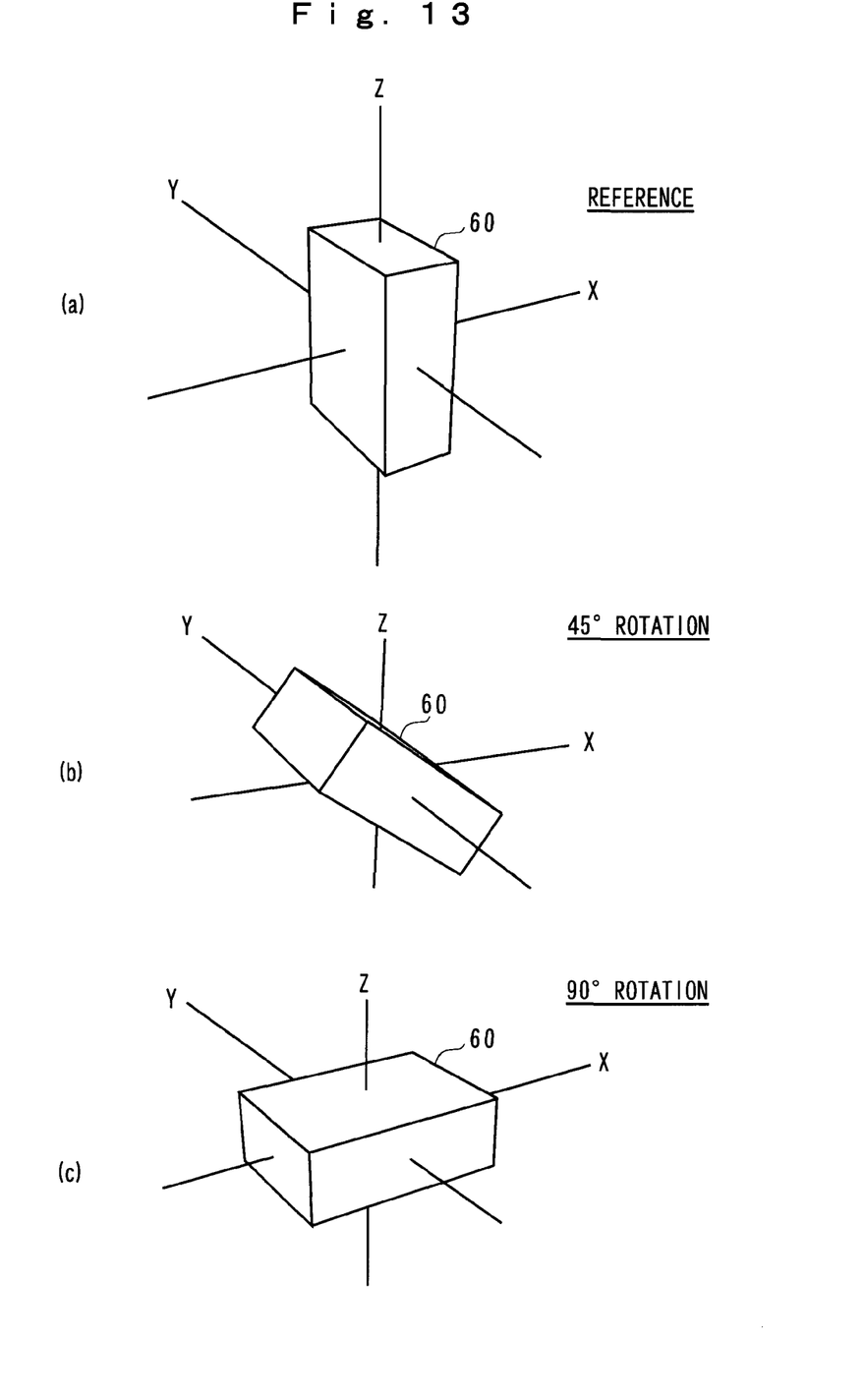
FIG. 13 is a view showing one example in which upon motion of the two nail regions, an object moves on the display.

Further, as shown in FIG. 10, where two nail regions G1, G2 are moved in a circular manner, as exemplified in FIG. 13, the object 60 is rotated (yawed) from a reference posture [FIG. 13(a)] at the center of the y axis. In this instance as well, the object 60 is rotated at an angle depending on an extent of motion of the nail regions G1, G2. For example, if the nail regions G1, G2 are rotated by 45°, it is rotated only by 45° [FIG. 13 (b)] and if rotated by 90°, it is rotated only by 90° [FIG. 13(c)].

Figure 14:
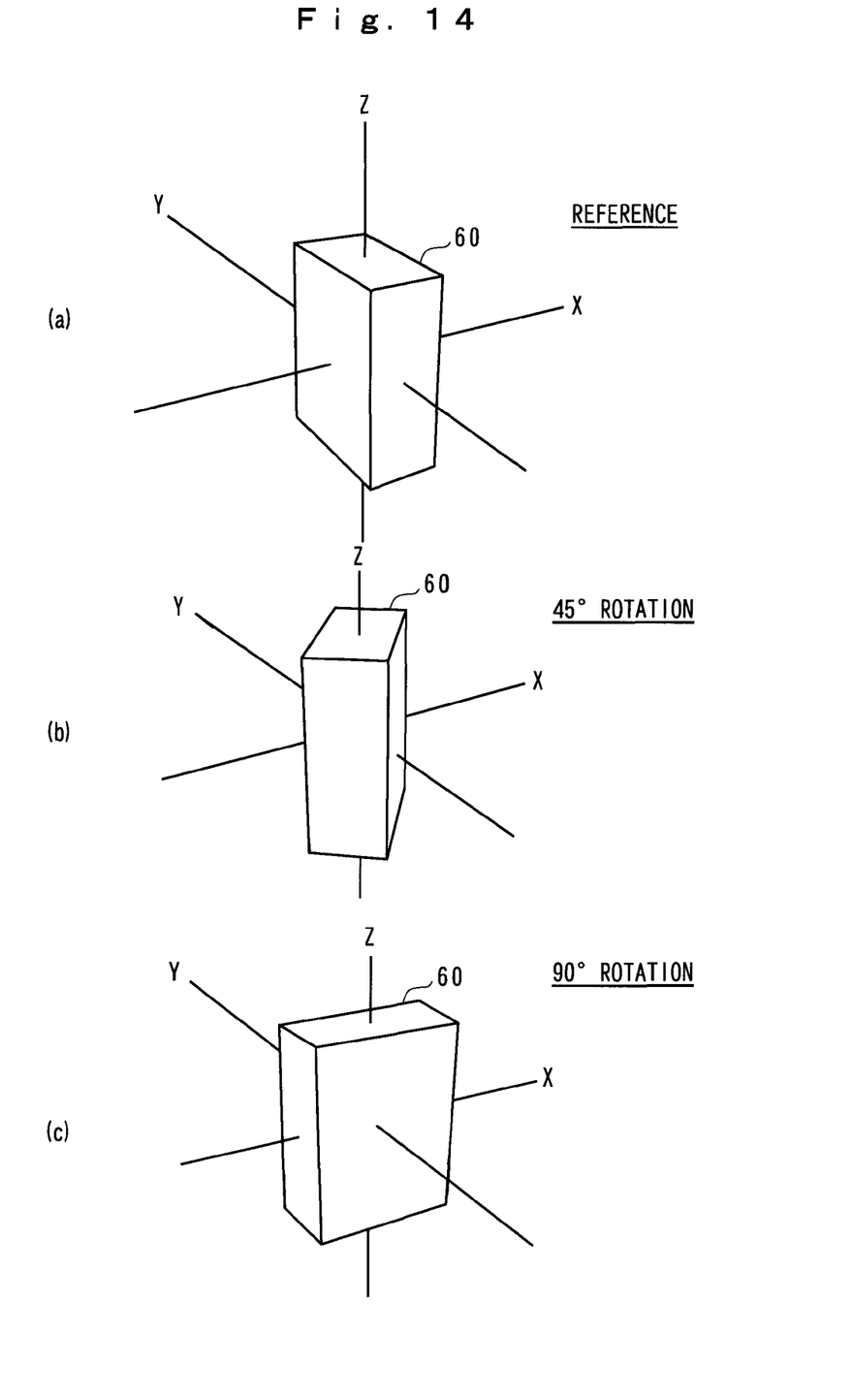
FIG. 14 is a view showing one example in which upon motion of the three nail regions, an object moves on the display.

Still further, as shown in FIG. 11, where three nail regions G1, G2, G3 are moved in a circular manner, as exemplified in FIG. 14, the object 60 is rotated (rolled) from a reference posture [FIG. 14(a)] at the center of the z axis. In this instance as well, the object 60 is rotated at an angle depending on an extent of motion of the nail regions G1, G2, G3. For example, if the nail regions G1, G2, G3 are rotated by 10°, it is rotated only by 45° [FIG. 14(b)], and if rotated by 20°, it is rotated only by 90° [FIG. 14(c)].

Figure 15:
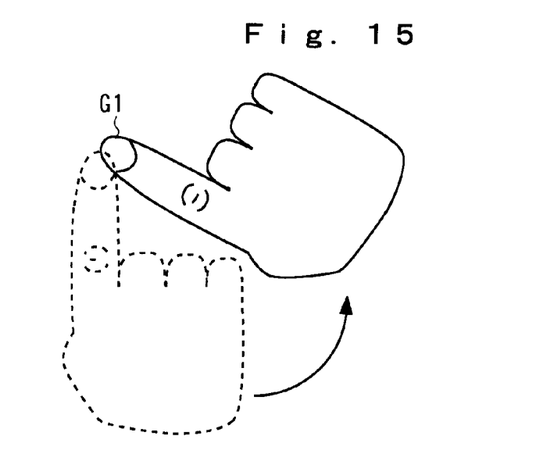
FIG. 15 is a view showing one embodiment in which upon rotational motion of the one nail region, the content on the display is controlled.

FIGS. 15, 16 and 17 are views showing other input methods. Here, the nail region is rotated, thereby indicating a rotational angle of the object. Where one nail region is provided, the x axis is indicated. Where two nail regions are provided, the y axis is indicated, and where three nail regions are provided, the Z axis is indicated. Therefore, as shown in FIG. 15, if one nail region G1 is rotated, as described by referring to FIG. 12, the object 60 on a display is rotated (pitched) at the center of the x axis. In this instance as well, the object 60 is rotated at an angle depending on an extent of rotation of the nail region G1. For example, if the nail region is rotated by 10°, it is rotated only by 45° [FIG. 12 (b)], if rotated by 20°, it is rotated only by 90° [FIG. 12(c)].

Figure 16:
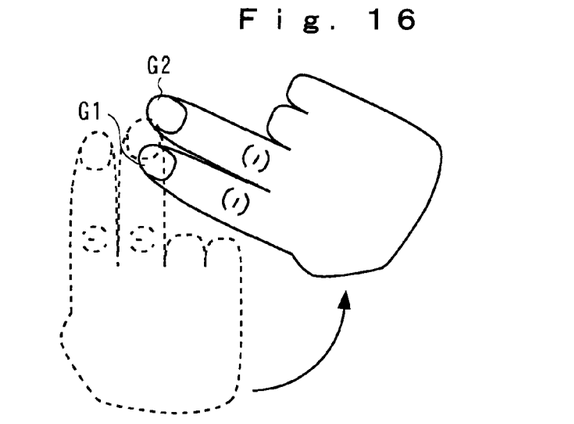
FIG. 16 is a view showing one embodiment in which upon rotational motion of the two nails region, the content on the display is controlled.
Figure 17:
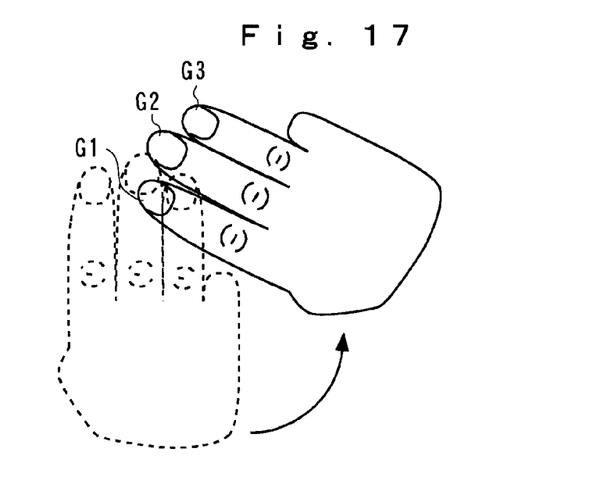
FIG. 17 is a view showing one embodiment in which upon rotational motion of the three nails region, the content on the display is controlled.

Similarly, as shown in FIG. 16, where two nail regions G1, G2 are rotated, as described by referring to FIG. 13, the object 60 is rotated (yawed) at the center of the y axis. Further, as shown in FIG. 17, where three nail regions G1, G2, G3 are rotated, as described by referring to FIG. 14, the object 60 is rotated (rolled) at the center of the Z axis.

In the above-described embodiment, a description has been made that the number of nail regions is allocated to a rotational axis, an extent of motion of the nail region and a rotational angle are allocated to a rotational angle of the object. However, the present invention shall not be limited thereto. For example, it is also acceptable that the number of the nail regions is allocated to a color component and a color tone of an image displayed on the display 4 may be controlled by the motion of the nail region. More specifically, if one nail region G1 is rotated, depending on the rotational angle thereof, an R component is to be controlled, if two nail regions G1, G2 are rotated, depending on the rotational angle thereof, a G component is to be controlled, and if three nail regions G1, G2, G3 are rotated, depending on the rotational angle thereof, a B component is to be controlled. Thereby, a mere motion of the nail regions makes it possible to easily adjust the color tone on the display 4.

Further, since the color tone on the display 4 depends not only on color components of R, G, B etc., but also on contrast or brightness, the number of second regions may be allocated for selecting these parameters.

Alternatively, the number of nail regions is allocated to a frequency range of sound, by which the quality of sound output from a speaker of the information terminal may be controlled by motions of the nail regions. More specifically, if one nail region G1 is rotated, depending on the rotational angle thereof, a low frequency component is to be controlled for the gain, if two nail regions G1, G2 are rotated, depending on the rotational angle thereof, a low frequency component is to be controlled for the gain, and if three nail regions G1, G2, G3 are rotated, depending on the rotational angle thereof, a magnitude of sound is to be controlled. Thereby, a mere motion of the nail regions makes it possible to easily adjust a quality of sound or a magnitude of sound.

In the above embodiment, description has been made by referring to an example where the terminal device of the present invention is applied to a cellular phone, to which the present invention shall not be, however, limited. The present invention may be applied similarly to a PDA and a computer having a photograph function. Further, the photograph function is not necessarily integrated into a terminal device. The present invention is also applicable to a system in which a device having the photograph function is connected to the terminal device by wired or wireless means.

What is claimed is:

1. A terminal device which is provided with a camera for shooting a subject continuously and a display,
the terminal device including:
first feature extraction means for extracting a feature from a shot image,
skin region extraction means for applying the extracted feature to a first learning model to extract a skin region,
nail region extraction means for applying a feature of the skin region to a second learning model to extract at least one nail region which is a part of the skin region,
motion detection means for detecting motions of the nail region, and
control means for controlling the terminal device on the basis of the detected motions.

2. The terminal device as set forth in claim 1, wherein the motion detection means includes at least any one of a counter for detecting a number of the nail region, scaling detection means for detecting a scaling of the nail region, moving detection means for detecting movement of the nail region, and direction detection means for detecting a direction of the movement of the nail region.

3. The terminal device as set forth in claim 2, wherein the control means allows an object on the display to move depending on the movement of the nail region.

4. The terminal device as set forth in claim 3, wherein the number of the nail region is allocated to an axis which is used as a reference for moving the object.

5. The terminal device as set forth in claim 4, wherein a first number of the nail region is allocated to the x axis, a second number of the nail region is allocated to the y axis, and a third number of the nail region is allocated to the z axis.

6. The terminal device as set forth in claim 2, wherein the control means controls a color tone of the display, depending on the movement of the nail region.

7. The terminal device as set forth in claim 6, wherein the number of the nail region is allocated to a color component to be controlled.

8. The terminal device as set forth in claim 2, wherein the terminal device is provided with a speaker, and
the control means controls sound output from the speaker on the basis of the movement of the nail region.

9. The terminal device as set forth in claim 8, a first number of the nail region is allocated to a frequency range, and a second number of the nail region is allocated to a magnitude of sound to be controlled.

* * * * *